(12) United States Patent
Francis

(10) Patent No.: US 12,137,163 B2
(45) Date of Patent: Nov. 5, 2024

(54) ENCRYPTION AND VERIFICATION METHOD

(71) Applicant: Airbus Defence and Space Limited, Stevenage (GB)

(72) Inventor: Patrick Francis, Stevenage (GB)

(73) Assignee: Airbus Defence and Space Limited, Stevenage (GB)

( * ) Notice: Subject to any disclaimer, the term of this patent is extended or adjusted under 35 U.S.C. 154(b) by 237 days.

(21) Appl. No.: 17/763,233

(22) PCT Filed: Sep. 24, 2020

(86) PCT No.: PCT/GB2020/052319
§ 371 (c)(1),
(2) Date: Mar. 24, 2022

(87) PCT Pub. No.: WO2021/058964
PCT Pub. Date: Apr. 1, 2021

(65) Prior Publication Data
US 2022/0407697 A1    Dec. 22, 2022

(30) Foreign Application Priority Data

Sep. 27, 2019    (GB) ..................................... 1913973

(51) Int. Cl.
*H04L 9/32*    (2006.01)
*H04L 9/06*    (2006.01)
*H04L 9/30*    (2006.01)

(52) U.S. Cl.
CPC .............. *H04L 9/32* (2013.01); *H04L 9/0618* (2013.01); *H04L 9/30* (2013.01)

(58) Field of Classification Search
CPC . H04L 9/32; H04L 9/0618; H04L 9/30; H04L 9/0833; H04L 9/321; H04L 9/3231;
(Continued)

(56) References Cited

U.S. PATENT DOCUMENTS 7,751,595 B2    7/2010 Russo
7,921,284 B1*   4/2011 Kinghorn ................ H04L 67/01
                                                            713/160

(Continued)

FOREIGN PATENT DOCUMENTS

CN    107222483 A    9/2017
CN    108418784 A    8/2018
(Continued)

OTHER PUBLICATIONS

International Search Report; priority document.
(Continued)

*Primary Examiner* — Abiy Getachew
(74) *Attorney, Agent, or Firm* — Greer, Burns & Crain, Ltd.

(57) ABSTRACT

A method of encrypting data, in particular encrypting data in dependence on a user verification confidence level. An encryption algorithm is provided, data is input into the encryption algorithm, along with a public key and an access structure comprising the user verification confidence level. The encryption algorithm is run to output a cypher text of encrypted data, whereby the access structure is embedded into the cypher text such that only an entity satisfying the access structure can decrypt the cypher text.

7 Claims, 1 Drawing Sheet

(58) Field of Classification Search
CPC ..... H04L 63/08; H04L 63/0861; H04L 63/10; H04L 63/105; G06F 2221/2107; G06F 2221/2113; G06F 21/602; G06F 21/6209; G06F 21/30; G06F 21/32; G06F 21/60; G06F 21/62

See application file for complete search history.

(56) References Cited

U.S. PATENT DOCUMENTS

| | | | |
|---|---|---|---|
| 8,224,873 | B1 | 7/2012 | Korablev et al. |
| 8,631,486 | B1* | 1/2014 | Friedman .............. H04L 63/105 726/19 |
| 9,100,453 | B2 | 8/2015 | Chen et al. |
| 9,805,213 | B1 | 10/2017 | Kragh |
| 10,565,360 | B2 | 2/2020 | Lee et al. |
| 10,574,643 | B2 | 2/2020 | Eisen et al. |
| 2004/0054893 | A1* | 3/2004 | Ellis .................. G06F 21/604 713/165 |
| 2004/0158723 | A1 | 8/2004 | Root |
| 2011/0035600 | A1* | 2/2011 | Busser .................. G06F 21/62 713/189 |
| 2013/0006754 | A1 | 1/2013 | Horvitz et al. |
| 2013/0067547 | A1 | 1/2013 | Horvitz et al. |
| 2015/0169890 | A1 | 6/2015 | D'Souza et al. |
| 2017/0272411 | A1 | 9/2017 | Huang et al. |
| 2019/0354714 | A1 | 11/2019 | Zhang et al. |
| 2022/0407697 | A1* | 12/2022 | Francis ................. H04L 9/321 |

FOREIGN PATENT DOCUMENTS

| | | |
|---|---|---|
| CN | 108881291 A | 11/2018 |
| CN | 109040045 A | 12/2018 |
| EP | 2587765 A2 | 5/2013 |
| GB | 2531839 A | 5/2016 |
| WO | 03007121 A2 | 1/2003 |
| WO | 2015054697 A1 | 4/2015 |
| WO | 2018049234 A1 | 3/2018 |
| WO | 2019080281 A1 | 5/2019 |

OTHER PUBLICATIONS

United Kingdom Search Report dated Apr. 7, 2020; priority document.
United Kingdom Search Report dated Aug. 18, 2020; priority document.
J. Bethencourt et al. "Ciphertext-Policy Attribute-Based Encryption" 2007 IEEE Symposium on Security and Privacy, pp. 321-334.
S. Muller et al. "Distributed Attribute-Based Encryption" Big Data Analytics in the Social and Ubiquitous Context—5th International Workshop on Modeling Social Media 2014.
J. Li et al. "Enhancing Attribute-Based Encryption with Attribute Hierarchy" Department of ECE, Illinois Institute of Technology, International Association for Cryptologic Research, vol. 20090624, Jun. 18, 2009, pp. 1-5.
Examination Report from corresponding GB application No. GB1913973.2 dated Oct. 31, 2023.

* cited by examiner

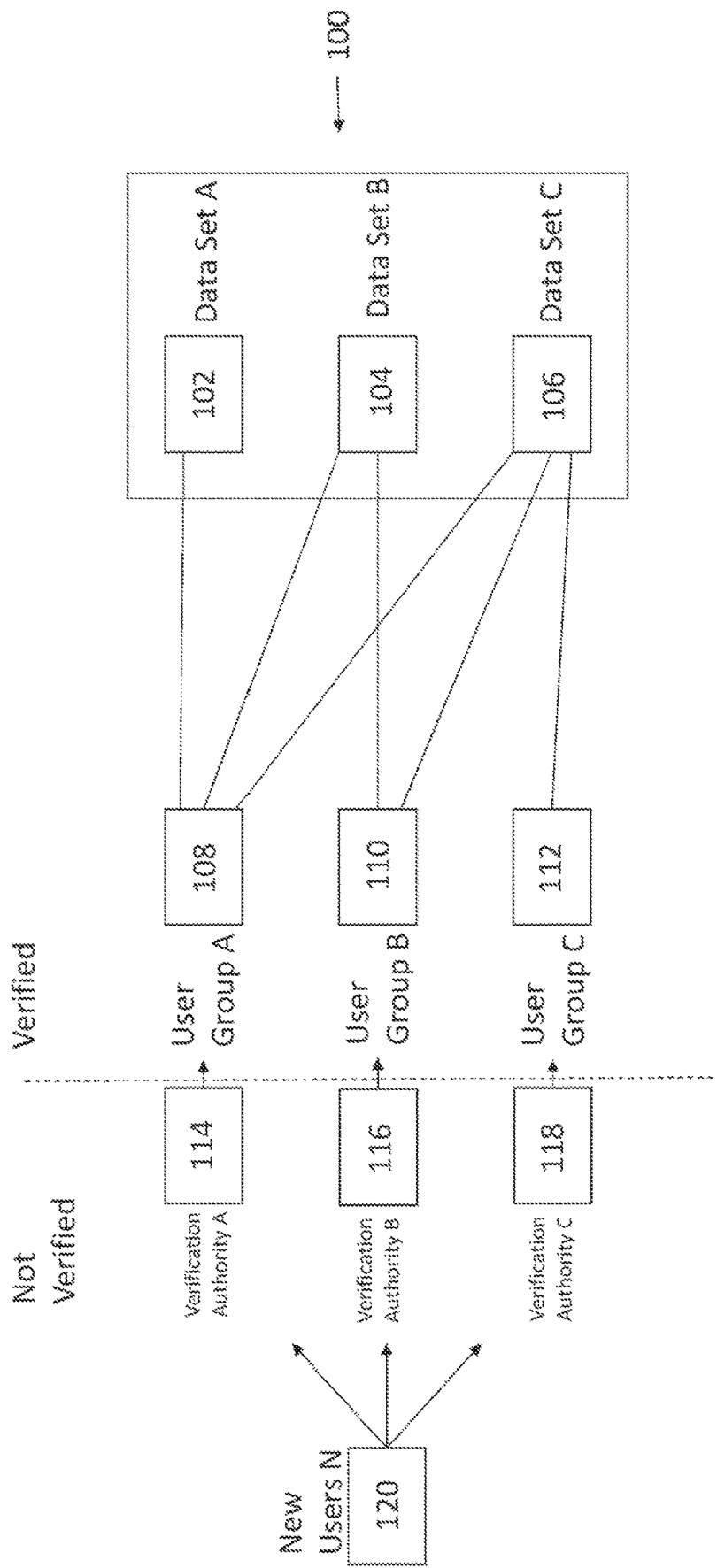

ENCRYPTION AND VERIFICATION METHOD

CROSS-REFERENCES TO RELATED APPLICATIONS

This application claims the benefit of the International Application No. PCT/GB2020/052319, filed on Sep. 24, 2020, and of the Great Britain patent application No. 1913973.2 filed on Sep. 27, 2019, the entire disclosures of which are incorporated herein by way of reference.

FIELD OF THE INVENTION

The present invention concerns a secure computer system and method for encrypting data within that system. More particularly, but not exclusively, this invention concerns controlling access to the encrypted data based on user attributes, for example a user verification confidence level. The invention also concerns allocation of user verification confidence levels by different user verification authorities.

BACKGROUND OF THE INVENTION

Various encryption methods exist which encrypt data such that it may only be decrypted by specific users. In order to qualify as a specific user, it may be required to verify the identity of a user in order that the user may be provided with an appropriate token or key which allows the encrypted data to be decrypted. Verification methods may include face-to-face verification of a user, including biometric checks, simple face-to-face verification, checking of identity documents such as a passport or driving license, or email based verification. Typically, a single verification method is used for a given system, in order that there is consistent verification practice, providing a suitable level of confidence that a user is allowed to access the encrypted data. However, such a system can prove inflexible, requiring low-level users to comply with high-level verification checks even if the data they wish to access is not highly sensitive and could be distributed more widely than other, more sensitive information. There may also be difficulties experienced when adding new users to a system, as data may require re-encryption to take into account the identity of the new users such that they may decrypt the encrypted data.

The present invention seeks to mitigate the above-mentioned problems.

SUMMARY OF THE INVENTION

According to a first aspect, the present invention provides a method of allocating a user verification confidence level to a user, comprising the steps of: providing a plurality of user verification checks, wherein each user verification check corresponds to a user verification confidence level, at least some of the user verification levels being different, choosing one of the plurality of user verification checks, performing the user verification check on the users, and, if the user passes the user verification check, allocating the user the user verification confidence level associated with the chosen user verification check to the user.

There may be several user verification authorities. Each user verification authority may require different verification authentication criteria. Each user verification authority may allocate a different user verification confidence level to each user that verification authority successfully verifies. For example, a first user verification authority may allocate the highest user verification confidence level to each user that passes the chosen verification checks. A second user verification authority may allocate a lower user verification confidence level to each user that passes the chosen verification checks. The different user verification authorities may have access to subsets of attributes, for example, the lower level user verification authorities may be configured such that they cannot allocate higher user verification confidence levels. This allows greater flexibility in provision of the lower level user verification authorities and adds to the control of access enabled by the present invention.

The user verification confidence level criteria may be used in a ciphertext-policy attribute-based encryption method. Such an encryption method is described in "Ciphertext-Policy Attribute-Based Encryption-Bethencourt, Sahai, Waters, 2007 IEEE Symposium on Security and Privacy https://ieeexplore.ieee.org/document/4223236."

According to a second aspect, there is provided a method of encrypting data comprising the steps of: providing data, providing a public key, providing an access structure including at least one user based attribute, the user based attribute comprising a user verification confidence level, providing an encryption algorithm, inputting the data, the public key, and the access structure into the encryption algorithm, running the encryption algorithm to output a cypher text of encrypted data, whereby the access structure is embedded into the cypher text such that only an entity satisfying the user verification confidence level can decrypt the cypher text.

The step of allocating a user verification confidence level to a user may comprise the steps of: providing a plurality of user verification checks, wherein each user verification check corresponds to a user verification confidence level, at least some of the user verification levels being different, choosing one of the plurality of user verification checks, performing the user verification check on the users, if the user passes the user verification check, allocating the user the user verification confidence level associated with the chosen user verification check to the user.

In such a system, there may be multiple tiers of access provided depending on the user based attributes defined in the access structure. The user based attribute may be one of a plurality of user verification confidence levels, such that data is encrypted differently for different user verification confidence levels. For example, there may be a higher user verification confidence level and a lower user verification confidence level. Certain data may be encrypted such that only the users satisfying the higher user verification confidence level are able to decrypt the data. Other data may be encrypted such that it may be decrypted by users with either the higher or lower user verification confidence levels.

According to a third aspect, the invention provides a method of a user decrypting data, wherein the data has been encrypted according to the method described with regards to the second aspect of the invention, comprising the steps of: the user obtaining the encrypted data, the user obtaining the public key, the user obtaining a private key, the private key formulated using the user verification confidence level linked to the access structure, providing the encrypted data, the public key, and the private key, to a decryption algorithm, and, provided the user verification confidence level for the private key complies with the required user verification confidence level, decrypting the encrypted data.

According to a fourth aspect, the invention provides a secure computer system comprising: a first group of users, the first group of users with a first user verification confidence level allocated by a first user verification authority, a second group of users, the second group of users with a second, different, user verification confidence level allocated by a second user verification authority.

The secure computer system may also comprise a memory, the memory comprising a first set of encrypted data and second set of encrypted data, wherein the first set of encrypted data comprises data encrypted by an encryption algorithm using the first user verification level as an input, and the second set of encrypted data comprises data encrypted by an encryption algorithm using the second user verification level as an input, the system further arranged such that the first group of users may access and decrypt the first set of encrypted data using a decryption algorithm that uses the user verification confidence level as an input, and the second group of users may access and decrypt the second set of data using a decryption algorithm which uses the user verification confidence level as an input.

The first set of data may be encrypted such that users with the first user verification confidence level and second user verification confidence level can decrypt the first set of data. The second set of data may be encrypted such that only users with the second user verification confidence level can decrypt the second set of data. In such a system, the first set of data may be less sensitive information than the second set of data. The first user verification confidence level may be a lower standard than the second user verification confidence level. An arrangement as described above allows the second set of users, with the second, higher, user verification confidence level to decrypt both the first set of data and second set of data. However, the first set of users are only able to decrypt the first set of data. As such, the system allows different types of users to operate within the same system, and only access and decrypt the data that is permissible for each user to see.

Each user verification confidence level may be an input to an encryption algorithm, such that data encrypted with the encryption algorithm can only be decrypted by users possessing the appropriate user verification confidence level.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which:

The FIGURE shows a schematic view of a secure computer system according to one aspect of the invention.

DETAILED DESCRIPTION OF THE PREFERRED EMBODIMENTS

A method of encrypting data is provided, comprising the following steps. A public key PK is provided along with an access structure A. An encryption algorithm E takes the public key PK, the access structure A, and the data D, and encrypts the data D to provide a cypher text CT. Only users that possess a set of attributes which satisfy the access structure A will be able to decrypt the cypher text CT.

E (PK, D, A)→CT

Using user based attributes, in particular the user verification confidence level, as an input into the encryption algorithm ensures that only the appropriate users, with the required user based attributes, are able to decrypt the encrypted information. Additionally, using a user attribute as an input to the encryption algorithm, rather than user identity, allows additional users to be added to a system such that they can access the data provided they possess the required user verification confidence level. There is no need to adjust the encrypted data to reflect the addition of the new users, as would be the case if the permissions criteria were based on specific user identity information.

The access structure comprises verification attributes, for example relating to the method by which the identity of a user is verified, and confidence the user verification process provides. This attribute may be called "user verification confidence level". Such levels of verification are:

Level 1: Little or no confidence in the asserted identity's validity

Level 2: Some confidence in the asserted identity's validity

Level 3: High confidence in the asserted identity's validity

Level 4: Very high confidence in the asserted identity's validity

Levels 1 and 2 may be remotely allocated using minimal checks, or remotely verified using a passport number or similar. Levels 3 and 4 require face-to-face verification prior to a user receiving a credential, with level 4 requiring additional biometric authentication linked with the credential. A different verification authority may be provided to allocate user verification confidence levels according to each level. For example, the level 1 user verification authority may be provided via a website interface. The level 4 verification authority may require physical checks undertaken at a specified location. There may be more than one verification authority corresponding to each user verification confidence level. For example, there may be a verification authority for verifying a first group of users, for example level 4 military users, and a distinct authority for verifying a second group of users, for example level 4 civil servants or private contractors. The level 4 verification authority may be able to allocate users lower user verification confidence levels. However, the lower verification authorities, for example the level 1 verification authority, cannot allocate user verification confidence levels higher than their specified level, in this case level 1.

The encryption algorithm E uses the access structure A to encrypt the data D so that only users with the required user verification confidence level may decrypt the data. For example, if the access structure specifies that the user verification confidence level is level 3, only level 3 or level 4 users are able to decrypt the cypher text CT.

Advantageously, such an arrangement provides a multi-tier system, where different level users may access a system and only view/decrypt the data which is appropriate to their user verification confidence level. Therefore, highly sensitive information, encrypted to a level 4 user verification confidence level can be exchanged or stored on the same system as much less sensitive information, which is encrypted to a level 1 user verification confidence level. Users with a higher user verification confidence level may access and decrypt data encrypted to a lower level, but not vice versa. Therefore, a user with a level 4 user verification confidence level may access and decrypt any data on the system, but a user with a level 3 user verification confidence level may only access and decrypt data which have been encrypted to a level 3 standard or below.

As can be seen, the encryption algorithm does not require a credential in order to encrypt data D. Instead, only the public key PK and the access structure A is required.

Therefore, it is possible that a level 1 user may encrypt data which is only then readable by a higher level user, for example level 4 user. Such an arrangement may make it more straightforward for sensitive information to be shared by users that have not passed or qualified for the higher level user verification confidence level. A higher level user may also decrypt the cypher text CT, and re-encrypt the data D using a different access structure A in order to allow lower level users to decrypt the data D.

In order to decrypt the cypher text CT, a key generation algorithm KG is run. The key generation algorithm KG uses the master key MK and a set of attributes S. The set of attributes S describe the user with reference to the various relevant attributes, which include the user verification confidence level. The key generation algorithm KG uses the master key MK and set of attributes S to output a private key or user credential SK. The private key or user credential SK is used by the specific user described by the set of attributes S to decrypt the cypher text CT.

KG (MK, S)→SK

Once the private key SK has been generated, the user utilizes a decryption algorithm DC, which takes the public key PK, the cypher text CT (which includes the access policy A) and the private key SK as input. If the private key SK indicates that the set of attributes S satisfies the access structure A (contained within the cypher text CT), then the cypher text CT is decrypted to return the data D.

DC (PK, CT, SK)→D

When a new user is added to the system, they undergo a user verification process, and are allocated a user verification confidence level. As can be seen, the decryption of the cypher text CT requires this user verification confidence level, contained within the private key SK, rather than a user related attribute specific to that user (for example, the user's identity). Therefore, the encryption of the data D has been done in such a way that the new user can decrypt the data provided their attribute is appropriate. This avoids having to decrypt and then re-encrypt the data, which would be the case if user specific attributes were used by the encryption algorithm E.

The FIGURE shows a schematic system diagram of an aspect of the invention. A secure computer system 100 comprises a memory including three sets of encrypted data, encrypted data set A 102, encrypted data set B 104, and encrypted data set C 106. The system further comprises three sets of users, user group A 108, user group B 110, and user group C 112. Each of the user groups is defined by the user verification confidence level of the users making up that group. User group A 102 comprises users with the highest user verification confidence level, user group C 106 comprises users with the lowest user verification confidence level, and user group B 104 comprises users with a user verification confidence level between user group A 102 and user group C 104. User group A 102 is verified by face-to-face and biometric checks. User group B 104 is verified by photographic identification, such as a passport. User group C 106 is verified by an email address. The different verification checks may be carried out by different verification authorities as shown. Verification authority A 114 verifies the identity of users that make up user group A 108. Verification authority B 116 verifies the identity of users that make up user group B 110. Verification authority C 118 verifies the identity of users that make up user group C 112. Encrypted data set A 102 has been encrypted using an encryption algorithm into which the user verification confidence level corresponding to user group A 108 has been input. Encrypted data set B 104 has been encrypted using an encryption algorithm into which the user verification confidence level corresponding to user group B 104 has been input. Encrypted data set C 106 has been encrypted using an encryption algorithm into which the user verification confidence level corresponding to user group C 112 has been input. Only users from user group A 108 possess the user verification confidence level required to decrypt encrypted data set A 102. User group A 108 and user group B 110 both possess a user verification confidence level required to decrypt encrypted data set B 104. User group A 108, user group B 110, and user group C 112 each possess a user verification confidence level required to decrypt data set C 106. This relationship is represented by lines leading from the user groups to the data sets to which they have access. Where a user group possesses the user verification confidence level required to decrypt an encrypted data set, they may also be allowed to re-encrypt the data set with a higher level of user verification confidence level. Additionally, when encrypting data for the first time prior to joining one of encrypted data sets A, B, or C, any user may choose any user verification confidence level for encryption. Therefore, a user from user group A 108 may decrypt data from encrypted data set A 102, and re-encrypt the data such that it joins encrypted data set B 104 or C 106. Also, a user from user group C 112 may encrypt data such that it joins encrypted data set A 102 or B 104, the data then no longer being accessible to users from user group C 112.

The system may comprise a new user group N 120, where users have not yet undergone user verification checks. A verification authority is arranged to perform user verification checks and allocate the new users to one of user group A, user group B, or user group C. Depending on the user group the new user wishes to join, the new user identity is checked by a verification authority which corresponds to the appropriate user verification confidence level. A verification authority A 114 is used to verify the identity of user group A 108 members. A verification authority B 116 is used to verify the identity of user group B 110 members. A verification authority C 118 is used to verify the identity of user group C 112 members. As the encryption of the data in the various different data sets, and therefore access to said data, is dependent on a user attribute, in this case the user verification confidence level, then new users can be included in the user groups A, B, and C, without needing to change the encryption of the data. Users may also be removed from the user group A, user group B, and user group C, by removing the user verification confidence level, allowing users to be removed from the system without having to change the encryption of the data.

While the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, while of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of encrypting data comprising the steps of:
   providing data,
   providing a public key,
   providing an access structure including a user based attribute, the user based attribute comprising a user verification confidence level allocated by providing a plurality of user verification checks, wherein each user verification check corresponds to a user verification confidence level, at least some of the user verification confidence levels being different, choosing one of the plurality of user verification checks, performing the user verification check on the user, and, when the user passes the user verification check, allocating the user the user verification confidence level associated with the chosen user verification check to the user independent of a specific user identity;
   providing an encryption algorithm,
   inputting the data, the public key, and the access structure into the encryption algorithm,
   running the encryption algorithm to output a cypher text of encrypted data,
   whereby the access structure is embedded into the cypher text such that only an entity satisfying the access structure can decrypt the cypher text.

2. The method as claimed in claim 1, wherein the data is encrypted differently depending on the user verification confidence level.

3. A method of a user decrypting data, wherein the data has been encrypted according to the method of claim 1, comprising the steps of:
   the user obtaining the encrypted data,
   the user obtaining the public key,
   the user obtaining a private key, the private key formulated using the user based attribute linked to the access structure,
   providing the encrypted data, the public key, and the private key, to a decryption algorithm,
   and, provided the user verification confidence level complies with the required user verification confidence level, decrypting the encrypted data.

4. The method as claimed in claim 1, wherein at least one of the user verification confidence levels requires an initial face-to-face verification or a biometric verification.

5. The method as claimed in claim 1, wherein at least one of the user verification confidence levels requires a photographic identification.

6. The method as claimed in claim 1, wherein at least one of the user verification confidence levels requires an email address.

7. The method as claimed in claim 1, wherein the user verification confidence levels are carried out by different verification authorities.

* * * * *